United States Patent Office 3,048,957
Patented Aug. 14, 1962

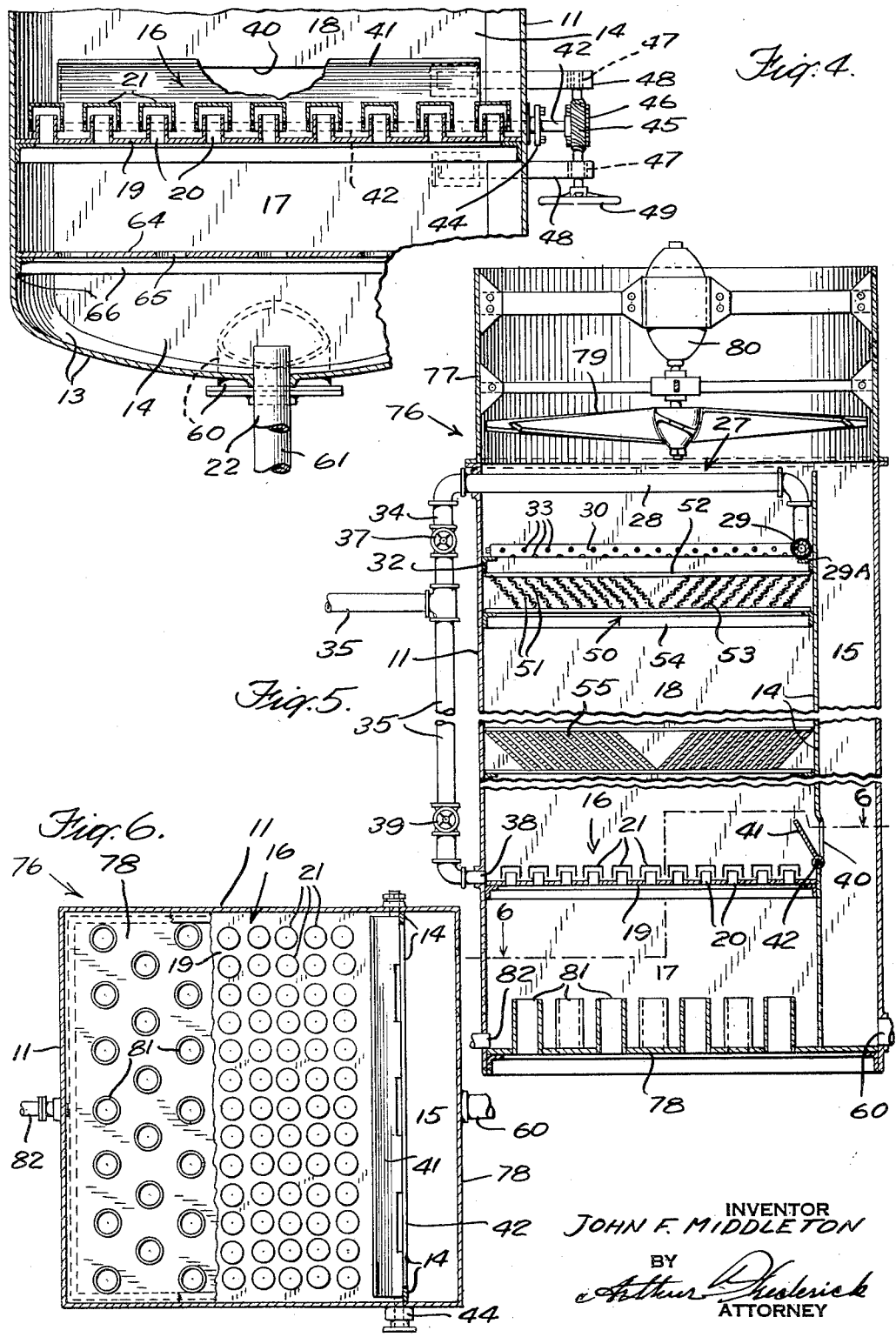

3,048,957
APPARATUS FOR EFFECTING COUNTER-CURRENT CONTACT BETWEEN LIQUID AND VAPOR STREAMS
John F. Middleton, New York, N.Y., assignor to Foster Wheeler Corporation, New York, N.Y., a corporation of New York
Filed Sept. 4, 1958, Ser. No. 759,006
13 Claims. (Cl. 55—257)

This invention relates to an apparatus for effecting countercurrent contact between vapor and liquid streams whereby material and/or heat transfer between the liquid and vapor is achieved.

In conventional apparatus, such as scrubbing columns, absorption columns, stripping columns, distillation columns or water cooling towers, either a variety of packing or a multiplicity of spaced vapor-liquid contact devices, commonly referred to as bubble trays, are necessary to effect intimate contact between the vapor and liquid phases and achieve the desired heat and/or material transfer. The bubble trays usually are provided with weirs to retain liquid hold-up through which vapor may flow to accomplish the desired contact between vapor and liquid. An operating characteristic of bubble trays discharging aerated liquid over a weir is, that liquid hold-up varies inversely with changes in vapor rate. Therefore, whatever may be the tray efficiency at the design rates of liquid and vapor flow, the tray efficiency for material or heat transfer between vapor and liquid phases tends to decrease from the value prevailing at the design rates as the vapor flow either decreases or increases. A further disadvantage of the conventional bubble tray is that, since the liquid hold-up increases as the vapor rate decreases, the tray must be designed initially with only a small hold-up of liquid so that a decrease in vapor rate will not cause the tray to become inoperative because of the consequent development of excessive pressure drop. Therefore, individual bubble tray efficiency has generally been sacrificed to achieve operating flexibility thereby necessitating the use of more bubble trays than are theoretically required in many applications involving the transfer of heat or material between liquid and vapor streams.

In applicant's copending application Serial No. 507,310, filed May 10, 1955, now abandoned, a vapor-fluid contact apparatus is disclosed in which sufficient liquid hold-up is provided to achieve substantially 100% of the theoretically obtainable efficiency while retaining the flexibility of operation found in conventional vapor-liquid contact apparatus and, consequently, providing a vapor-liquid contact apparatus having a substantially lesser number of bubble trays than are necessary in conventional types of vapor-liquid contact columns.

The present invention constitutes an improvement over applicant's aforementioned application and has for its object a vapor-liquid apparatus having but one bubble tray and in which any amount of liquid hold-up can be provided to achieve a multiplicity of theoretical stages of heat and/or composition transfer above a single tray that ordinarily requires the installation of a multiplicity of bubble trays in commercial vapor-liquid contacting equipment.

Another object of this invention is to provide a vapor-liquid contact apparatus wherein liquid hold-up is automatically adjusted in the same direction as changes in vapor flow rate. A still further object of the present invention is to provide a vapor-liquid contact apparatus in which flexibility of operation can be achieved with a falling vapor flow rate even where the liquid hold-up is extremely large.

Accordingly, the present invention contemplates a novel apparatus for effecting countercurrent contact between vapor and liquid streams which comprises a vertically disposed hollow shell connected to receive vapor at the bottom and having means for introducing liquid into the shell at the upper portion thereof. A chordal wall extends from the bottom of the shell upwardly to a point in spaced relationship to the top of the shell to divide the interior of the shell into a relatively large vapor-liquid contact chamber and a downcomer passageway. A bubble tray is disposed transversely across the vapor-liquid contact chamber and in relatively close spaced relationship to the bottom of the shell. The tray is secured to the shell and chordal wall in a fluid-tight manner. The chordal wall is provided with a discharge opening adjacent the bubble tray. Means for controlling flow of aerated liquid from the tray through the discharge opening is provided so that any predetermined amount of liquid hold-up between the tray and the top of said chordal wall can be obtained, which amount of liquid hold-up is that which is necessary to provide the number of theoretical stages of heat and/or composition transfer between the vapor and liquid streams. The topmost edge of the chordal wall acts as a weir and functions to prevent flooding of the column by discharging aerated liquid into the downcomer thereby limiting the level of liquid hold-up to a certain predetermined maximum.

The concept of this invention can best be understood by comparison with the operation of a packed column employed for countercurrent contacting of liquid and vapor streams. In a packed column, liquid enters at the top of the column and is distributed over the whole flow area of the column so that the liquid will travel downwardly over the surface of the packing and, to some extent, through the interstices between individual fragments which constitute the packing of the column. The vapor stream enters the bottom of the column and flows upwardly through the interstices in the packed bed. In this way, the liquid is made to spread itself out into a thin layer clinging to the surfaces of the packing and thereby presenting a very large area for the vapor stream, flowing in the opposite direction, to contact.

In the present invention a similar function or operation is achieved without use of packing material. The necessary liquid surface area is provided by aeration of the liquid to an extremely large head of froth or foam above the bubble tray and which head of foam is maintained by the vapor flowing therethrough.

In the operation of the vapor-liquid contact apparatus of this invention the discharge opening in the chordal wall is initially closed in start-up operation and liquid is introduced onto the bubble tray. Vapor is introduced into the shell and, in passing through the bubble tray and into contact with the liquid thereon, rapidly aerates the liquid until the contact chamber is substantially filled with foam. It is then that liquid is introduced into the top of the column and the vapor flow rate increased while the tray discharge opening is partly opened so that the contact chamber remains filled with foam, but none overflowing the top of the chordal wall. The vapor and liquid flow rates are then gradually increased along with gradually increasing the opening of the discharge opening until an equilibrium level of aerated liquid hold-up is maintained near the top of the chordal wall. Simultaneously with the increase of liquid introduced at the upper part of the column, a proportionate decrease in liquid introduced directly onto the bubble tray is effected. When the flow rates of vapor and liquid have been increased to the design or predetermined values, no liquid is introduced directly on the bubble tray and all of the liquid is introduced at the upper part of the column so that the vapor and liquid streams pass through a deep bed of foam in countercurrent relationship to each other.

Means are provided in the column adjacent the place of introduction of liquid into the upper part of the column to insure distribution of liquid across the entire flow area of the contact chamber and to retard the flow of liquid to prevent the liquid from breaking down the cellular-like structure of the bed of foam.

Coalescing means is disposed at intermediate points between the top of the vapor-liquid contact chamber and the bubble tray supporting the foam to prevent the tendency for back-mixing of the liquid phase due to the rising vapor stream. The coalescing means functions to cause liquid, carried upwards by the vapor stream, to coalesce and to return to the section of the tower immediately below the coalescing means. In this way, variation of liquid composition from top to bottom of the contact chamber is assured.

If vapor flow rate should increase somewhat above the design rate causing an increase in liquid hold-up, flooding of the column is prevented by aerated liquid overflow into the downcomer passageway defined by the chordal wall and the shell.

In a second embodiment, the concept of the present invention is shown as applied to a water cooling tower. The water cooling tower is essentially of the same construction as the vapor-liquid apparatus, hereinbefore discussed, and differs basically therefrom in that the shell or housing is shown as square in cross section rather than circular and is provided therein with a fan to induce flow of air through the tower.

The invention will be more fully understood from the following detailed description thereof when considered in connection with the accompanying drawing wherein two embodiments of the invention are illustrated by way of example, and in which:

FIG. 4 is a view, in section, taken along line 4—4 of FIG. 3;

FIG. 5 is an elevational view, in section, of a second embodiment of this invention; and FIG. 6 is a section taken along line 6—6 of FIG. 5.

Figure 1:
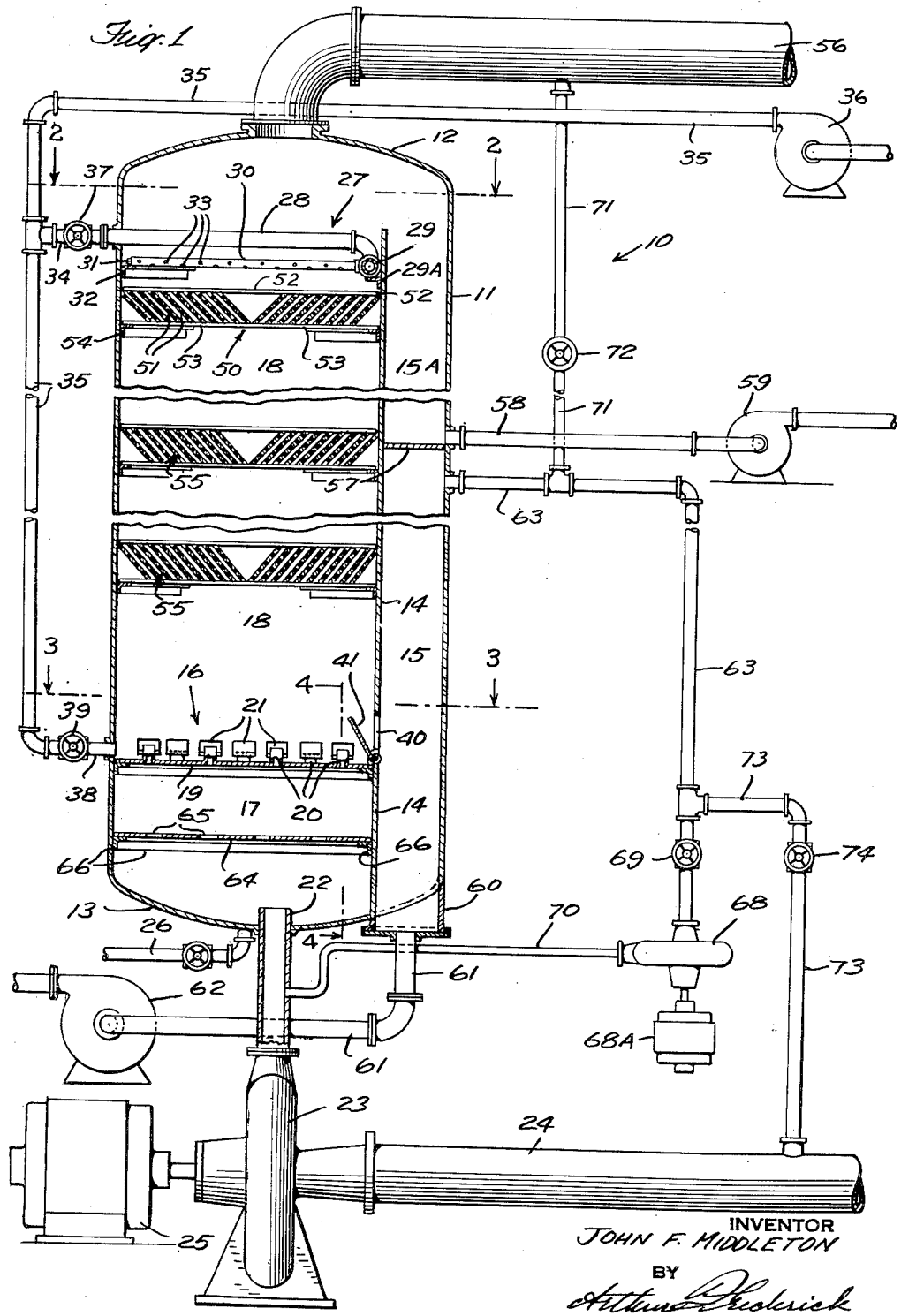
FIG. 1 is an elevational view in section, of a liquid-vapor contact column according to a first embodiment of this invention.

Referring now to the drawings, and more particularly to FIGURES 1 to 4, the reference numeral 10 designates a vapor-liquid contact apparatus according to a first embodiment of this invention. Vapor-liquid contact apparatus 10 comprises a cylindrical shell or vessel 11 which is disposed to extend vertically and is closed at opposite ends by a top wall 12 and a bottom wall 13. A chordal wall or partition 14 is disposed in vessel 11 and extends from bottom wall 13 upwardly to a point in spaced relationship with the top wall 12 of vessel 11. Partition 14 is secured in a fluid-tight manner to the wall of vessel 11 and bottom wall 13 of the latter to divide the interior of vessel 11 into a relatively large chamber and a relatively small downcomer passageway 15. Partition 14 may be dimensioned so that the cross-sectional area of downcomer passageway 15 is 5 to 15 percent of the total cross-sectional area of the interior of vessel 11.

A bubble tray 16 is positioned in vessel 11 in spaced relationship with bottom wall 13. Tray 16 extends transversely and horizontally of vessel 11 and is secured in a suitable manner to the interior wall surface of vessel 11 and to partition 14. Tray 16 divides the relatively large chamber in vessel 11 into a vapor inlet chamber 17, below the tray, and a vapor-liquid contact chamber 18, above the tray. Tray 16, as shown, comprises a plate 19 having a plurality of riser pipes 20 and bubble caps 21 which are supported over the riser pipes 20. While tray 16 is shown as comprising riser pipes and bubble caps, the tray may be of any other suitable construction, such as a perforated plate.

A vapor inlet pipe 22 is secured in the center of bottom wall 13 of vessel 11 and is connected to the pressure side of a compressor 23, which compressor is connected, through a vapor feed pipe 24, to a source of vapor (not shown). Compressor 23 is suitably driven, as by a motor 25, to draw vapor from a source thereof through feed pipe 24 and force the vapor through inlet pipe 22 into inlet chamber 17 of vessel 11. Inlet pipe 22 extends into chamber 17 above bottom wall 13 a suitable distance, as for example, approximately six inches, to avoid the possibility of liquid entering inlet pipe 22 during periods when compressor 23 is not in operation. Liquid which passes through tray 16 and accumulates on the bottom wall 13 of vessel 11 is drawn off, as required, through a valved drain line 26. The valve of drain line 26 is normally closed during operation of vapor-liquid contact apparatus 10 since, with a properly constructed tray, little or no leakage past the tray will occur. However, some leakage will occur in the course of start-up and shut-down operation of apparatus 10. Although the supply of vapor to inlet pipe 22 is indicated in FIG. 1 as being delivered by compressor 23, the operation of this invention is not limited to this means of vapor supply. For example, the vapor could proceed from the evaporation of a liquid in an evaporator or reboiler having a suitable pipe connection between its vapor outlet and the vapor inlet 22 of vessel 11.

In the upper part of vapor-liquid chamber 18 is disposed a liquid feed assembly 27 which comprises a feed pipe 28, manifold 29 and a plurality of branch pipes 30. Feed pipe 28 extends horizontally through vessel 11, in a plane slightly below the top edge of partition 14 to a point adjacent partition 14. Feed pipe 28, adjacent partition 14, is connected to a manifold 29 which lies below pipe 28 and extends horizontally adjacent and parallel to partition 14. A plurality of spaced parallel branch pipes 30 are disposed in a horizontal plane below feed pipe 28 and each is suitably connected at one end to manifold 29. The distal ends of branch pipes 30 are closed, as by threaded plugs 31, and are supported by an arcuate-shaped angle iron 32 which is secured, as by welding, to the interior surface of vessel 11. Manifold pipe 29 is supported by a straight angle iron 29A which is secured to partition 14. Each of the pipes 30 are provided with a plurality of spaced discharge orifices 33 arranged along the lower peripheral portions of the pipes. Exteriorly of vessel 11, feed pipe 28 is connected by a line 34 to a liquid delivery pipe 35 which, in turn, is connected to a source of liquid (not shown) through a pump 36. Liquid is forced by pump 36 from a source thereof through pipe 35 to line 34. From line 34, the liquid is delivered to feed pipe 28 and thence to manifold 29 from where the liquid is distributed to branch pipes 30. Liquid is discharged from branch pipes 30 into chamber 18 through orifices 33. A valve 37 is provided in line 34 so that flow of liquid to assembly 27 and into chamber 18 may be controlled.

An inlet pipe 38 is secured to vessel 11 slightly above the plane of plate 19 of bubble tray 16. Pipe 38 is connected to the lower end of delivery pipe 35 to receive liquid therefrom and to pass liquid directly onto tray 16. Flow of liquid, through inlet pipe 38 and onto tray 16, is controlled by a valve 39 which is disposed in pipe 38.

Partition 14 is provided with an elongated aerated liquid discharge opening 40 disposed adjacent bubble tray 16. Opening 40 is positioned slightly above the level of plate 19 of tray 16 so that a weir is provided adjacent bubble tray 16 to provide a sufficient depth of liquid on the bubble tray when opening 40 is not closed.

Figure 3:
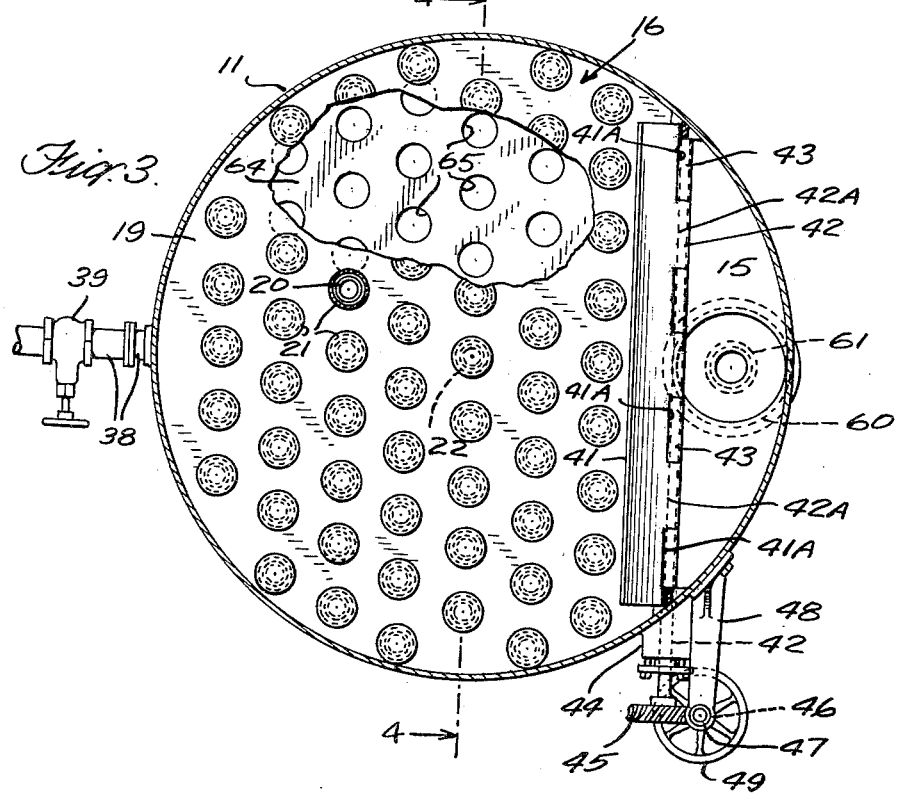
FIG. 3 is a sectional view taken substantially along line 3—3 of FIG. 1 on the same scale as FIG. 2.

A movable plate or gate 41 is pivotally mounted, as hereinafter described, on the partition 14 along the lower edge of opening 40 so that by actuation of gate 41 the size of opening 40 may be varied. As best shown in FIG. 3, gate 41 is provided with spaced loop portions 42A along its lower edge through which loop portions 42A extends a shaft 42. Shaft 42 is fixedly secured as by welding or in any other suitable manner to gate 41 at loop portions 42A. Partition 14 along the lower periphery of opening 40 is provided with spaced circular loops 43. The lower edge of gate 41 is provided with spaced cut-outs 41A which are alternately arranged with respect to loop portions 42A, each of the cut-outs 41A being dimensioned to receive a circular loop 43. Loops 43 are adapted to receive shaft 42 therethrough and serve as bearings to support shaft 42 for axial rotation. Shaft 42 extends exteriorly of vessel 11 and is rotatably supported in the wall of vessel 11 by a stuffing box 44 which is secured within an opening in the wall of vessel 11. A suitable packing material surrounding shaft 42 within stuffing box 44 seals the opening in the wall of vessel 11, in a vapor and liquid-tight manner, when compressed by the gland of stuffing box 44. Shaft 42 projects a short distance outwardly from stuffing box 44. A worm wheel 45 is fastened to the outermost end of shaft 42. Worm wheel 45 is disposed in meshing relationship with a worm 46, the shaft of worm 46 being rotatably mounted in bearings 47. Bearings 47 are secured within vertically spaced brackets 48 which are secured to the exterior surface of the wall of vessel 11 and project therefrom. The lower end of the worm shaft extends beyond bracket 48 and is provided with a hand wheel 49 by which worm 46 may be rotated.

As can be seen from the foregoing description, rotation of handwheel 49 causes rotation of worm 46. Since worm 46 is in mesh with worm wheel 45, rotation of worm 46 rotates worm wheel 45. Rotation of worm wheel 45 rotates shaft 42 within stuffing box 44 and loops 43, and, since gate 41 is fixedly secured to shaft 42, gate 41 is rotated in an arc toward or away from partition 14 depending upon the direction of rotation of handwheel 49. Accurate adjustment of gate 41 can be achieved by the aforedescribed actuating mechanism because gate 42 can be moved in small increments of arc. The actuating mechanism also effects a locking of the gate 41 in any desired position.

Plate or gate 41 is dimensioned so that, when in the vertical or fully closed position, the upper edge portion and side portions of gate 41 overlap the periphery of opening 40 and abuts the surface of partition 14.

It should be understood that the control of the effective size of aerated liquid discharge opening 40 is not limited to the aforedescribed mechanism. For example, the size of opening 40 may be varied by means of louvers, sluice gates or sliding panels which are suitably connected to an external control means. The only requirements of suitable alternate gate mechanisms are that they be capable of varying the size of opening 40 to any desired fraction of its area, from completely closed to completely open, and that the desired position remains unchanged for as long as the operation of vapor-liquid contact apparatus my require.

Figure 2:
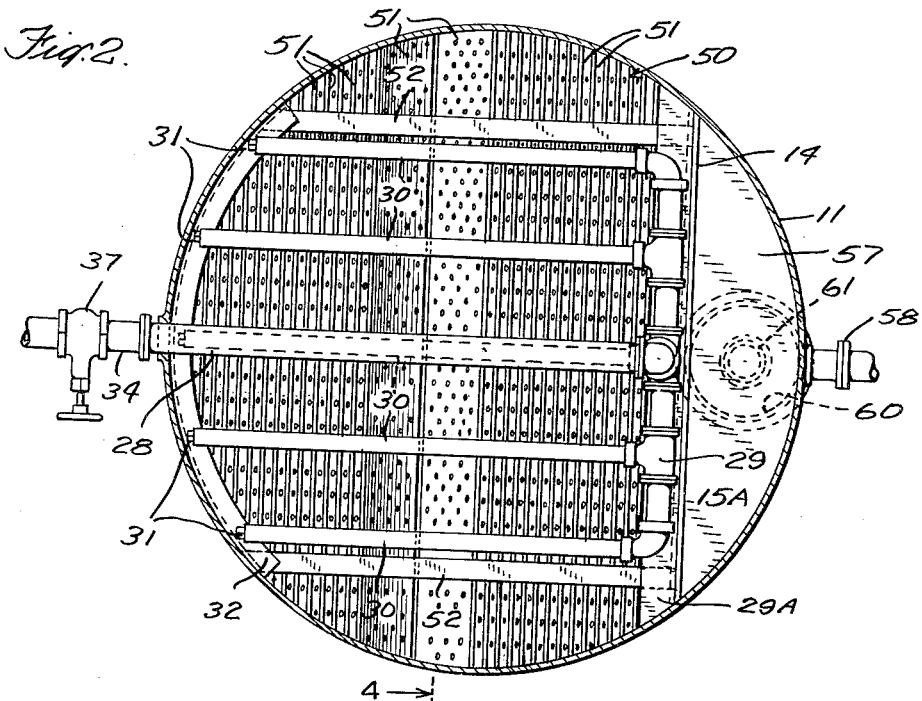
FIG. 2 is a transverse section taken along line 2—2 of FIG. 1 on a somewhat enlarged scale.

In the upper part of chamber 18 of vessel 11, and in close spaced relationship to liquid feed assembly 27, is arranged a liquid distribution member 50. Member 50 comprises a plurality of thin baffle plates 51 which are arranged in closely spaced parallel relationship to each other. Plates 51 extend transversely of vessel 11, at right angles to branch pipes 30, and are arranged across the entire flow area of chamber 18. Plates 51 are disposed at an angle to the horizontal, as for example between 30° and 60° of the horizontal, and are secured along their upper edge portions to a plurality of spaced bars 52 (only two of which are shown in FIG. 2) and along their lower edge portions by a plurality of spaced bars 53 (only one of which is shown in FIG. 1). The opposite ends of lower bars 53 are supported by angle irons 54 which are secured to the inner surface of the wall of vessel 11 and partition 14. Plates 51 may consist of thin sheets which may be perforated, imperforate or may consist of wire screens. The plates need only be sufficiently thick to provide the rigidity needed to support their own weight plus the slight forces brought to bear on them by the flow of vapor and liquid through the interstitial parallel passages formed therebetween. If the plates are constructed of wire mesh or a perforated plate, the size of the mesh or the perforations should be small enough to permit the liquid flowing across them to seal all the openings by virtue of the surface tension of the liquid so that an unbroken sheet of liquid will flow from the upper edge portion of each plate towards the lower edge portion. Member 50 functions to retard the flow of liquid and at the same time promotes uniform distribution of the liquid across the whole cross-section of chamber 18. The importance of reducing the velocity of the flow of liquid will be hereinafter explained.

An outlet pipe 56 is secured at one end to the center of top wall 12 of vessel 11 to receive vapor from chamber 18 after the vapor has passed in heat and/or material transfer with liquid in chamber 18.

A plate 57 is disposed in downcomer passageway 15 and is secured in a fluid-tight manner to partition 14 and the inner surface of the wall of vessel 11 to divide the downcomer passageway into two sections. The portion of passageway 15 above plate 57 will hereinafter be referred to as the overflow compartment 15A, which compartment communicates with chamber 18 through the space between the top edge of partition 14 and top wall 12 of vessel 11.

Vessel 11 is provided with a liquid discharge pipe 58 which communicates with overflow compartment 15A at a point immediately above the upper surface of plate 57. Pipe 58 is connected to the low pressure side of a pump 59 which draws the liquid from overflow compartment 15A through pipe 58.

Vessel 11 is provided with an outlet pipe 60 which communicates through bottom wall 13 with downcomer passageway 15. Outlet pipe 60 is connected through a pipe 61 of the low pressure side of a pump 62. Outlet pipe 60 is for the purpose of withdrawing liquid which accumulates in the bottom of the downcomer passageway 15. Since fluid flow through opening 40 is aerated liquid, the vapor disentrained from the liquid in downcomer passageway 15 rises to the upper part of the latter. A vapor outlet pipe 63 is connected through the wall of vessel 11 at a point adjacent the underside of plate 57 so that vapor may be drawn off from downcomer passageway 15 for recirculation back into vessel 11 or discharged as hereinafter described.

As shown in FIGS. 1 and 3, baffle plate 64 is installed in vapor inlet chamber 17 between bottom wall 13 and bubble tray 16. Baffle plate 64 is provided with a plurality of perforations 65 through which vapor passes from inlet pipe 22 to tray 16. Plate 64 is supported between the wall of vessel 11 and partition 14 by angle irons 66 which are attached to the inner surface of the wall of vessel 11 and partition 14. Plate 64 is disposed between bottom wall 13 and tray 16 with plate 64 spaced from tray 16 a distance which is at least equal to, but not more than twice the distance plate 64 is spaced from the outlet of pipe 22. The number and size of perforations 65 may also be proportioned so that the total flow area of perforations 65 is approximately midway between that of the flow area of the outlet of pipe 22 and the sum of the cross-sectional flow areas of riser pipes 20 of bubble tray 16. The purpose of plate 64 is to cause the vapor steam entering vessel 11 by way of inlet pipe 22, upon impingement against plate 64, to be distributed over the entire flow area of chamber 17 so that the vapor flow through the entire area of bubble tray 16 will be at a substantially uniform velocity.

Intermediate of the liquid distribution member 50 and the bubble tray 16, a number of liquid coalescing baffles 55 may be installed. As indicated in FIG. 1 these are substantially similar in construction to the liquid distribution member 50, described previously, but other types of baffles, such as multiple sheets of wire mesh or foraminous plates, etc., would also be satisfactory. Their purpose is to restrain the tendency of the liquid to be carried upwards by the vapor stream and to assure an adequate composition gradient in the aerated liquid between the top and bottom of the contact chamber 18. Aerated liquid impinging on the barriers 55 will tend to coalesce thereon and be returned to the underside, while the vapor continues to flow upwards through the interstices. At the same time, liquid posessing the composition prevailing on the upper side of each barriers 55 will flow downwards at the same rate as the fresh feed liquid is delivered at the top of the chamber by the assembly 27. Thus, even if the liquid temperature or composition between any adjacent pair of the barriers 55 should tend to be uniform because of the movement imparted by the vapor flow, a gradient will exist between the liquid resident in successive parts of the chamber 18 defined by the various coalescing baffles 55 because of the countercurrent nature of the liquid and vapor streams. The spacing of the barriers 55 depends on the rates of heat or material transfer available between the liquid and vapor phases of the system passing through the chamber 18. In general, it is expected that the spacing will be small when transfer rates are high and as the transfer rates diminish, the spacing between adjacent baffles 55 will increase. By installing the baffles 55, the fractional height of the chamber 18, equivalent to a theoretical unit of material or heat transfer, may be materially lessened.

In operation of vapor-liquid contact apparatus 10, vapor is supplied to vessel 11 by compressor 23 which draws vapor from a suitable source thereof (not shown). Compressor 23 discharges vapor into inlet chamber 17 of vessel 11 through pipe 22. Initially, the rate of vapor flow is only a fraction of the full rate of vapor flow contemplated in the design of the apparatus. Simultaneously, with the flow of vapor into vessel 11 liquid is introduced into vessel 11, directly on tray 16. The flow of liquid onto tray 16 is accomplished by valve 37 in line 34 being in a closed position while valve 39 in pipe 38 is in an open position. With valves 37 and 39 in a closed and open position, respectively, liquid is pumped by pump 36 from a suitable source of liquid through feed pipe 35 and thence into inlet pipe 38 from where the liquid is discharged directly on bubble tray 16. The rate of liquid flow is also controlled to a fraction of the design rate of flow in the start-up operation of apparatus 10. At this time gate 41 is positioned vertically to completely close discharge opening 40 in partition 14. As the vapor phase flows upwardly through riser pipes 20 of tray 16 and into the liquid on plate 19 of bubble tray 16, the liquid and vapor become intimately mixed and the liquid entering upon tray 16 is expanded in volume as it becomes aerated by the passage of vapor therethrough. The vapor which passes through the liquid flows upwardly through vapor-liquid contact chamber 18, through the interstices of the various baffles 55 and thereafter through the spaces between plates 51 of member 50 and into and through outlet pipe 56. If the vapor flow rate is unchanged, under the foregoing operating conditions, liquid would continue to accumulate on tray 16 and the density of the aerated liquid or foam would increase. Since efficient operation requires a maximum surface contact between the vapor and liquid phases, it is desirable to produce a foam of aerated liquid having the lowest density which is compatible with a continuous liquid phase and dispersed vapor phase. Accordingly, as the liquid accumulates on tray 16, the vapor flow rate is gradually increased to maintain foam density at a predetermined low value. This operating procedure is continued until the vapor-liquid chamber 18 becomes filled with foam (heterogeneous mixture of vapor and liquid) which begins to flow over the top edge of partition 14 into overflow compartment 15A. The foam which overflows the top edges of partition 14 is permitted to accumulate on plate 57 to allow vapor entrained therein to separate from the liquid and flow upwardly through the overflow compartment and out of vessel 11 through outlet pipe 56. The clear vapor-free liquid is withdrawn from overflow compartment 15A through outlet pipe 58 and pump 59 to the source of feed liquid (not shown).

When the foam overflows the top edge of partition 14, gate 41 is gradually opened to permit flow of aerated liquid through discharge opening 40 into downcomer passageway 15. The vapor which disengages from the aerated liquid in downcomer passageway 15 flows upwardly in the latter and is conducted out of the upper part of downcomer passageway 15 by way of outlet pipe 63. The clear liquid, resulting from the escape of vapor from the aerated liquid in downcomer passageway, accumulates in the bottom of downcomer passageway 15 and is drawn off by pump 62 through outlet pipe 60 and pipe 61 and is delivered to a liquid receiver (not shown). Thereafter, gate 41 is slowly pivotally moved further away from partition 14 to further increase the size of opening 40 by slowly turning handwheel 49 (FIGS. 3 and 4) of the mechanism for actuating gate 41. As more of the aerated liquid passes through discharge opening 40 and, since homogeneous or clear liquid continues to flow onto tray 16 through inlet pipe 38 at a constant rate, the amount of aerated liquid or foam overflowing the top of the edge of partition 14 gradually diminishes and finally ceases entirely. At this time all the liquid entering on tray 16 through pipe 38 is discharged in aerated condition through opening 40, after a brief residence in the chamber 18. In downcomer passageway 15, disengagement of vapor and liquid phases takes place and clear liquid is withdrawn by way of outlet pipe 60, pipe 61 and pump 62 at the same rate at it is delivered through the pipe 38. Thus an equilibrium hold-up of aerated liquid is established in chamber 18 above the bubble tray 16. Since the apparatus is not yet functioning in a truly countercurrent fashion at this point, the composition of the liquid withdrawn from the downcomer 15 may not be suitable for the liquid product required of the operation and, in that case, would be delivered by the pump 62 to separate storage for subsequent recycling, when the countercurrent action is finally established. The height of the aerated liquid is above member 50 but below the top edge of partition 14. Since no aerated liquid is overflowing the top edge of partition 14 and no liquid is accumulating at the bottom of the overflow compartment 15A, the operation of pump 59 is stopped.

Although, equilibrium flow rates of vapor and liquid feed and vapor and liquid outlet streams have been established, the flow rates are only at a fraction of their design rates of flow and the contact between the vapor and liquid phases is not countercurrent to each other. To increase the liquid rate and cause the liquid to flow countercurrent to the vapor, the rate of feed pump 36 is slowly increased while valve 37 in line 34 is gradually opened to cause flow of liquid into the top of chamber 18 via line 34 and liquid feed assembly 27. With valve 37 open, flow of liquid is effected through line 34 into feed pipe 28 and thence into manifold 29. Thereafter the liquid flows into branch pipes 30 and is discharged therefrom through orifices 33 downwardly into chamber 18. Momentarily, the density of the bed of foam on tray 16 is increased, upon entry of additional liquid into chamber 18 via assembly 27 and, therefore, the vapor flow rate into vessel 11 through inlet pipe 22 is increased. The simultaneous increase of liquid and vapor feed rates causes an increase in the volume of foam on tray 16 so that foam will again overflow from chamber 18, over the top edge of partition 14, into overflow compartment 15A. To again restore proper equilibrium, gate 41 is further pivotally moved away from partition 14 to increase the size of discharge opening 40 by rotation of handwheel 49. In this manner, by gradually increasing the liquid flow rate through line 34 into liquid feed assembly 27 and in turn into chamber 18 and increasing the vapor flow rate through inlet pipe 22 with simultaneously increasing the size of opening 40 by actuation of gate 41, as well as accelerating the liquid and vapor withdrawals from vessel 11 by way of pipes 60 and 56, respectively, the predetermined design rates of flow are approached while an equilibrium hold-up of aerated liquid is maintained at an optimum density between bubble tray 16 and the top edge of partition 14. Complete countercurrent flow of liquid and vapor, through the relatively deep bed of foam in chamber 18, is achieved by completely closing valve 39 in pipe 38 and fully opening valve 37 in line 34 so that the liquid charge passes through pipe 28, manifold 29 and branch pipes 30 into the top of chamber 18. Upon establishment of completely countercurrent flow of liquid downwards and vapor upwards through the chamber 18 at the predetermined rates of flow, the outlet vapor stream leaving by way of pipe 56 and the outlet liquid stream withdrawn by pump 62 approach the required compositions of the products and may then be delivered to the storage (not shown) assigned for the useful products of the operation. The recycling of these streams, which may have been necessary during the start-up procedure, would cease as soon as accumulation of useful products was commenced.

In full operation of vapor-liquid apparatus 10, gate 41 is adjusted in an open position where the size of opening 40 is sufficient to keep the level of the bed of foam in contact with the lower edge of plates 51 of distribution member 50. With the upper surface of the bed of foam in contact with the plates 51, the feed liquid flows in a thin stream downwards over the whole length of each plate 51 and flows off the lower edges of the plates 51 into the liquid phase of the bed of foam without breaking the cellular-like structure of the bed of foam. Meanwhile the vapor flows upwardly through the spaces between plates 51 of distributing member 50. The flow of vapor through the interstices between plates 51 in a direction opposite to the flow of liquid tends to reduce the velocity of the liquid and thereby assists in the introduction of liquid into chamber 18, and the bed of foam, without disturbing the cellular-like structure of the bed of foam.

Under the conditions of operation described, the liquid flows vertically downwards through the bed of foam (aerated liquid) and is discharged in admixture with some vapor through discharge opening 40. At the same time vapor flows vertically upwards through the bed of foam and in heat and/or material transfer with the liquid and thence out of vessel 11 by way of pipe 56 at the top of vessel 11 to a vapor product receiver (not shown). As previously stated, vapor disengaged from the liquid in downcomer passageway 15 is withdrawn from the latter through pipe 63 for recirculation back into vessel 11 or other disposition.

Evacuation of vapor from downcomer passageway 15 is provided by pipe 63 which is connected at its end opposite from downcomer passageway 15 to the suction side of a compressor 68, compressor 68 being driven by a motor 68A. Pipe 63, adjacent pump 68, is provided with a valve 69. The pressure side of pump 68 is connected by a line 70 to inlet pipe 22 to deliver vapor to the latter into admixture with the vapor flowing through pipe 22. Another alternate means for withdrawing vapor is provided by way of line 71 which is connected at one end to vapor outlet pipe 56 and at the opposite end to pipe 63. A valve 72 is provided in line 71 to control vapor flow therethrough. A third means for recirculating vapor is provided by line 73 which is connected at one end to pipe 63, downstream from line 71, and at the other end to vapor feed pipe 24. A valve 74 is provided in line 73 to control vapor flow therethrough. With valve 69 in pipe 63 closed, and valve 74 in line 73 closed, and valve 72 in line 71 open, vapor will flow through pipe 63 into and through line 71 thence into pipe 56 to join the vapor stream flowing from the top of vessel 11. Evacuating downcomer passageway 15 through line 71, has the effect of causing a fraction of the vapor to bypass contact with the liquid in chamber 18. Therefore, this means of flowing vapor from downcomer passageway 15 is only employed when the resulting contamination of the vapor stream, flowing through pipe 56 by the bypassed vapor flowing from line 71 into pipe 56, can be tolerated. With valves 69 and 72 in a closed position and valve 74 in line 73 in an open position, vapor flows from downcomer passageway 15 through pipe 63 into and through line 73 and thence into vapor feed line 24. While evacuating the vapor from downcomer passageway 15 via line 73 for recirculation into vessel 11 is desirable, it is only feasible when the pressure in the vapor feed pipe 24 is sufficiently less than the pressure prevailing in downcomer passageway 15 so as to cause flow of vapor into feed pipe 24.

In the foregoing description a vapor-liquid contact apparatus has been described which has a wide range of operating flexibility. For example, at liquid and vapor flow rates above the design rates, the excess liquid hold-up is discharged over the top edge of partition 14 and overflows into overflow compartment 15A from which disentrained vapor is carried off through outlet pipe 56 and substantially clear liquid is withdrawn through pipe 58 for recirculation through vessel 11. Although withdrawal of liquid from overflow compartment 15A and recycle thereof represents a slight loss of operating efficiency, it is nevertheless a useful feature of the apparatus because it obviates the need for interrupting the operation of the apparatus in the event of a momentary increase of feed vapor and feed liquid charge rates above the design rates for optimum efficiency. Without overflow chamber 15A, even small increase in feed rates above those required to maintain chamber 18 full of foam to the level of distributor assembly 50 would cause rapid expansion of the foam bed into the vapor line 56. The resulting excessive entrainment of liquid in the vapor stream would necessitate suspension of operation of the apparatus to permit correction of the situation. However, the provision of overflow chamber 15A permits correctional adjustments in operation without shut-down of the apparatus. An apparatus 10 of still greater operational flexibility may be provided by providing a greater distance between the top edge of partition 14 and liquid feed assembly 27 than is shown in FIG. 1 so that the level of the bed of foam is further below the top edge of partition 14. In this construction, the level of the bed of foam is permitted to rise and fall over a greater distance and thereby allowing for greater fluctuations in liquid and vapor flow rates above the design rates.

Operational flexibility is also available at the low end of the predetermined operating range, since a falling vapor rate will cause the level of foam in chamber 18 to fall until only sufficient liquid remains on the bubble tray 16 to seal the slots of the bubble caps 21. While this also constitutes inefficient operation of apparatus 10, it is an advantageous operating condition which permits subsequent resumption of the normal operating conditions without the need of shutting down the apparatus.

In FIGS. 5 and 6, a vapor-liquid contact apparatus 76 according to a second embodiment of the present invention is illustrated in which air and water are brought into contact for the purpose of cooling the water; such apparatus being commonly referred to in the art as cooling towers. In the following description of the embodiment shown in FIGS. 5 and 6 the compartment parts of vapor-liquid contact apparatus 76 corresponding to like parts of the vapor-liquid contact apparatus 10 will be designated by the same reference numerals.

Vapor-liquid contact apparatus 76 only differs from the embodiment shown in FIGS. 1 to 4 in that vessel 11 is square in transverse section rather than circular and is provided with an upper cylindrical portion 77. The vapor-liquid contact apparatus 76 further differs from apparatus 10 in that the bottom of vessel 11 is closed by a perforated floor 78. A suction fan 79 is disposed in and supported by upper sportion 77 whereby air is drawn through the perforations of floor 78, thence through chamber 18, and out of vessel 11 to atmosphere through the top of upper portion 77. Fan 79 is driven by a motor 80 which is also suitably supported in upper portion 77. A tube 81 is secured in each of the perforations of floor 78 in a fluid-tight manner and extends above the floor a substantial distance so that a quantiay of water may be held on floor 78 without interfering with the entry of air into apparatus 76. A drain pipe 82 is connected to vessel 76 adjacent the upper surface of floor 78 to carry out excess water which accumulates on floor 78. A further distinction between the vapor-liquid contact apparatus 76 and the embodiment shown in FIGS. 1 to 4 is that no dividing plate 57 is provided in downcomer passageway 15 so that overflow of aerated water over the top edge of partition 14 flows to the bottom of the downcomer passageway 15 past discharge opening 40. Similarly, air which disengages from the aerated water in the lower end of downcomer 15 leaves through the upper part of the latter and passes out to the atmosphere, along with the major fraction of the air stream leaving the chamber 18, by way of the cylindrical portion 77.

The operation of vapor-liquid contact apparatus 76 is essentially the same as the operation of vapor-liquid contact apparatus 10 shown in FIGS. 1 to 4. The principal operating differences arise because the vapor circulated through chamber 18 of apparatus 76 is air which is discharged to atmosphere with no need to recover any part of it. Therefore, in operation, air is drawn by fan 79, through tubes 81, bubble tray 16, thence through a bed of aeerated water in chamber 18 and is discharged to atmosphere at the top of cylindrical portion 77. The water which is discharged into chamber 18 by means of liquid feed assembly 27 is cooled by virtue of the evaporation of part of the water, the vaporized portion of the wtaer being entrained by the air stream flowing upwardly through chamber 18. The cooled aerated liquid discharges through discharge opening 40 into downcomer passageway 15 where the aerated liquid remains for a sufficeint length of time to permit separation of the water and vapor phases. The cooled clear water is withdrawn for use through outlet pipe 60.

In operation of vapor-liquid contact apparatus 76, fan 79 is operated to induce air flow into and through vessel 11 with gate 41 adjusted in its extreme vertical position against partition 14 so that aerated liquid discharge opening 40 is completely closed. Valve 37 is in a closed position to prevent flow of water into liquid feed assembly 27, while valve 39 is in an open position to permit flow of water directly onto bubble tray 16. Water is allowed to accumulate on tray 16 and is aerated by the flow of air through bubble tray 16. Continued flow of water on the tray 16 and further aeration thereof by air flowing through the liquid provides a bed of aerated liquid or foam which fills chamber 18. When the bed of aerated water reaches the level of member 50, valve 37 is slowly moved to an open position to admit water into line 34, pipe 28, manifold 29 and branch pipes 30, the water being discharged into chamber 18 through orifices 33 in the branch pipes 30. As the level of foam rises above member 50, gate 41 is slowly rotated in a direction away from partition 14 by rotation of shaft 42 so as to gradually open discharge opening 40 to allow aerated water to flow through the latter into downcomer passageway 15. When sufficient clear water has accumulated in the bottom of downcomer passageway 15 to provide a suction head for a pump (not shown in FIG. 5) connected to line 60, a valve (not shown) in line 60 is opened and the pump is operated to withdraw water from the downcomer passageway 15 to a place of use. The withdrawal of water from downcomer 15 being at the same rate at which the water enters the downcomer passageway 15. Gradually the rate of flow of water through pipes 34 and 38, past valves 37 and 39 in the respective pipes, is increased to the required design rate and simultaneously therewith gate 41 is slowly opened to open discharge opening 40 sufficiently to keep the level of foam below the top edge of partition 14 but above the lower edges of plates 51 of member 50. At the same time as the foregoing, the rate of withdrawal of clear cooled water through line 60 is increased to match the rate of warm water flow into chamber 18. By this operational procedure, an equilibrium inventory of foam is established in chamber 18 and an equilibrium level of clear cooled water is maintained in the lower part of downcomer passageway 15 at a level lower than the level of plate 19 of bubble tray 16. Thereafter, valve 39 is moved to a fully closed position while valve 37 in line 34 is moved to a fully open position whereby all of the warm water is introduced into chamber 18 by way of liquid feed assembly 27. Under these operating conditions the apparatus is continuous without further adjustment, except as may be required to compensate for changes in the rate of flow of warm water. When changes in the rate of supply of warm water occur so that the level of foam is displaced above or below the normal operating level, that is in the vicinity of the lower edges of the plates 51 of the distributing assembly 50, a compensating adjustment in the position of gate 41 in respect to opening 40 is made. If the foam level rises, gate 41 is rotated away from partition 14, thereby permitting a larger volume of aerated water to be discharged through opening 40. Conversely a drop in the foam level below distributing assembly 50 will call for a slight closing of gate 41 towards partition 14. Adjustments of the flow of aerated water through opening 40 may require compensating adjustments of the rate of removal of clear cooled water from the bottom of downcomer 15 through outlet 60. One or more coalescing barriers 55 may also be provided in chamber 18 of apparatus 76.

From the foregoing it can be readily seen that a cooling tower has been provided which is not dependent upon any packing to effect intimate contact between the water and air. Furthermore, the height of the cooling tower according to this invention may be considerably less than conventional cooling towers of comparable capacity. It is a more efficient cooling tower than conventional cooling towers since a more intimate contact of air and water is achieved by reason of the bed of foam, which high degree of contact, results in the humidity and temperature values of the air leaving the apparatus to approach more closely the equilibrium values related to the temperature of the entering warm water than is possible in a conventional tower which is packed with contact members, such as wooden slats. This more intimate contact of air and water achieved in the cooling tower of this invention provides a cooling tower requiring substantially less air flow than a conventional cooling tower to effectively cool the same quantity of water to the same degree.

Although, two embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A vapor-liquid contact apparatus for effecting counter-current contact between vapor and liquid streams, comprising a vessel forming a fluid-tight enclosure, first means for introducing a vapor into the lower portion of said vessel, second means for introducing feed liquid into the upper portion of the vessel, outlet means in the upper portion of the vessel to pass vapor from the latter, a baffle means extending from the bottom of the vessel to a point in spaced relationship to the outlet means and secured to the inner surfaces of said vessel to divide the interior of said vessel into a liquid-vapor contact chamber and discharge passageway, a tray disposed across said liquid-vapor contact chamber and secured to said vessel and said baffle means, said tray being adapted to receive liquid thereon and to pass vapor from said first means into said liquid to aerate the latter, said baffle means cooperating with said tray to provide a bed of aerated liquid in said liquid-vapor contact chamber extending above the tray to a height necessary to provide a predetermined thermal and/or composition transfer between the vapor and liquid over a predetermined wide range of vapor and liquid flow rates so that the vapor flowing through said outlet means of the vessel is of predetermined temperature and/or composition, partition means disposed in said discharge passageway to divide the latter into an overflow passageway and a downcomer passageway, a discharge means in said baffle means adjacent said tray to pass aerated liquid from the latter into said downcomer passageway, said overflow passageway communicating with the liquid-vapor contact chamber to receive aerated liquid from the latter to prevent flooding of the apparatus, a first outlet line connected adjacent the lower end of said overflow passageway to receive and withdraw substantially unaerated liquid from said overflow passageway, a second outlet line connected adjacent the bottom of said downcomer passageway to receive the substantially unaerated liquid from said downcomer passageway, and a third line communicating with the upper part of the downcomer passageway to receive and withdraw vapor disentrained from the liquid in the downcomer passageway.

2. A vapor-liquid contact apparatus for effecting counter-current contact between vapor and liquid streams, comprising a vessel forming a fluid-tight enclosure, first means for introducing vapor into the lower portion of the vessel, second means for passing feed liquid into the upper portion of said vessel, an outlet means in the upper portion of the vessel for passing vapor from the latter, a baffle means extending from the bottom of said vessel to a point in spaced relationship to the outlet means and secured in a fluid-tight manner to the inner surfaces of said vessel to divide the interior of said vessel into a relatively small downcomer passageway and a relatively large liquid-vapor contact chamber, said downcomer passageway being in communication with said outlet means, liquid distribution means disposed in the upper part of said liquid-vapor contact chamber to receive liquid from said second means to retard the flow of liquid and distribute the liquid across the flow area of said liquid-vapor chamber, a bubble tray disposed across the liquid-vapor chamber adjacent the lower portion of said vessel and secured to said vessel and said baffle means, said tray being adapted to receive liquid thereon and to pass vapor from said first means into the liquid on the tray to aerate the latter, said baffle means cooperating with said tray to provide a bed of aerated liquid in said liquid-vapor contact chamber extending above the bubble tray to a height necessary to provide a predetermined thermal and/or composition transfer between the vapor and liquid over a predetermined wide range of vapor and liquid flow rates so that the vapor flowing through said outlet means of the vessel is of predetermined temperature and/or composition, and discharge opening in said baffle means disposed adjacent said bubble tray and substantially below the top of said bed of aerated liquid, said discharge opening communicating with said vapor-liquid chamber and said downcomer passageway to pass aerated liquid into the latter to maintatin an equilibrium level of aerated liquid in said liquid-vapor contact chamber, gate means pivotally connected to said baffle means adjacent said discharge opening and adjustable to vary the size of said discharge opening to control the amount of flow of aerated liquid from said tray into said downcomer passageway, third means for passing liquid from said downcomer passageway out of said vessel, and a plurality of spaced coalescing members disposed in the vapor-liquid contact chamber between the tray and said second means to disengage liquid entrained by the vapor flowing upwardly through the vapor-liquid contact chamber.

3. A vapor-liquid contact apparatus for effecting countercurrent contact between vapor and liquid streams, comprising a vessel forming a fluid-tight enclosure, a baffle disposed within said vessel and extending from the bottom of the latter to a point in spaced relationship with the top of the vessel, said baffle being secured to the inner surface of said vessel to divide the vessel into a vapor-liquid contact chamber and a discharge passageway, a tray disposed across said vapor-liquid contact chamber and secured to said vessel and said baffle, means for introducing vapor into said vessel at a point below said tray, second means for passing liquid into said vessel at a point substantially above said tray, said tray being adapted to receive liquid thereon and to pass vapor into contact with said liquid to aerate the liquid, said baffle cooperating with said tray to provide a bed of aerated liquid in said vapor-liquid chamber of a height sufficient to effect substantially complete thermal and/or composition transfer between the liquid and vapor at predetermined vapor and liquid flow rates, an outlet means disposed in the upper part of said vessel in communication with said vapor-liquid contact chamber and the discharge passageway to receive vapor and pass vapor from the vessel, a partition disposed in said discharge passageway to divide the latter into an overflow chamber and a downcomer passageway, an aperture in said baffle communicating the vapor-liquid contact chamber with said downcomer passageway to pass aerated liquid from said tray into said downcomer passageway, and third means for controlling the size of said aperture.

4. The apparatus of claim 3 wherein a distribution means is disposed to receive feed liquid from said second means to distribute feed liquid across the area of said vapor-liquid contact chamber and retard the flow of liquid to prevent said liquid from breaking the cellular-like structure of said bed of aerated liquid.

5. The apparatus of claim 3 wherein a fourth means is provided for passing feed liquid directly on the tray.

6. The apparatus of claim 3, wherein a line is provided for withdrawing vapor from the downcomer passageway and a second line is provided for withdrawing substantially unaerated liquid from said overflow chamber.

7. The apparatus of claim 3 wherein a line is connected at one end to said downcomer passageway to receive vapor from the latter and connected at the opposite end to said first-mentioned means for passing vapor to the latter for recirculation through said vessel.

8. A vapor-liquid contact apparatus for effecting counter-current contact between vapor and liquid streams, comprising a vessel forming a fluid-tight enclosure, a baffle disposed within said vessel and extending from the bottom thereof to a point in spaced relationship with the top of the vessel, said baffle being secured in a fluid-tight manner to the inner surface of said vessel to divide said vessel into a vapor-liquid contact chamber and a discharge passageway, a tray disposed across said vapor-liquid contact chamber and secured to said vessel and said baffle, means for introducing vapor into said vapor-liquid contact chamber at a point below said tray, second means communicating with a source of feed liquid for introducing liquid onto said tray, said tray being adapted to receive liquid thereon and to pass vapor into contact with said liquid to aerate the liquid, said baffle cooperating with said tray to provide a bed of aerated liquid in said vapor-liquid contact chamber of a height sufficient to effect substantially complete thermal and/or composition transfer between the liquid and vapor at predetermined vapor and liquid flow rates, said second means further including means for introducing liquid into said vessel at a point substantially above said tray and above said bed of aerated liquid and to distribute liquid across the bed so as to pass liquid therethrough, control means for regulating the rate of flow of liquid in the liquid introducing means and the rate of flow of vapor in said vapor introducing means, outlet means disposed in the upper part of said vessel in communication with said vapor-liquid contact chamber, aperture means in said baffle to communicate said vapor-liquid contact chamber with said discharge passageway to pass aerated liquid from said tray into said discharge passageway, and means for controlling the size of said aperture means for controlling the flow of aerated liquid from said tray.

9. Apparatus according to claim 8 wherein said second means includes means adjacent the tray for introducing liquid directly onto the tray.

10. A vapor-liquid contact apparatus for effecting counter-current contact between vapor and liquid streams, comprising a vessel forming a fluid-tight enclosure, a baffle disposed within said vessel and extending from the bottom thereof to a point in spaced relationship with the top of the vessel, said baffle being secured in a fluid-tight manner to the inner surface of said vessel to divide said vessel into a vapor-liquid contact chamber and a discharge passageway, a tray disposed across said vapor-liquid contact chamber and secured to said vessel and said baffle, means for introducing vapor at a controlled flow rate into said vapor-liquid contact chamber at a point below said tray, second means communicating with a source of feed liquid for introducing liquid onto said tray at a controlled flow rate, said tray being adapted to receive liquid thereon and to pass vapor into contact with said liquid to aerate the liquid, said baffle cooperating with said tray to provide a bed of aerated liquid in said vapor-liquid contact chamber of a height sufficient to effect substantially complete thermal and/or composition transfer between the liquid and vapor at predetermined vapor and liquid flow rates, said second means including means to introduce liquid into said vessel at a point substantially above said tray so as to pass liquid through said bed, distribution means adjacent the upper portion of said vessel above the bed of aerated liquid to distribute said liquid across the area of said vapor-liquid contact chamber and to retard the flow of liquid to prevent said liquid from breaking the cellular-like structure of said bed of aerated liquid, outlet means disposed in the upper part of said vessel in communication with said vapor-liquid contact chamber, aperture means in said baffle to communicate said vapor-liquid contact chamber with said discharge passageway to pass aerated liquid from said tray into said discharge passageway, and means for controlling the size of said aperture means for controlling the flow of aerated liquid from said tray.

11. Apparatus according to claim 10 wherein said distribution means comprises a plurality of thin baffle plates in closely spaced relationship to each other and disposed at an angle relative to the horizontal and across said vapor-liquid contact chamber.

12. Apparatus according to claim 11 wherein said baffle plates are foraminous.

13. Apparatus according to claim 11 and including coalescing means disposed in said vapor-liquid contact chamber between said tray and said distribution means for disengaging liquid entrained in said vapor.

References Cited in the file of this patent

UNITED STATES PATENTS

| | | |
|---|---|---|
| 1,748,704 | Chillas et al. | Feb. 25, 1930 |
| 1,782,735 | MacKenzie | Nov. 25, 1930 |
| 1,873,771 | Levin | Aug. 23, 1932 |
| 2,052,994 | Watts | Sept. 1, 1936 |
| 2,070,578 | Bowman | Feb. 16, 1937 |
| 2,520,391 | Findlay | Aug. 29, 1950 |
| 2,682,395 | Claridge et al. | June 29, 1954 |
| 2,877,099 | Bowles | Mar. 10, 1959 |

FOREIGN PATENTS

| | | |
|---|---|---|
| 146,473 | Austria | July 10, 1936 |
| 878,151 | France | Sept. 28, 1942 |
| 943,527 | Germany | May 24, 1956 |